United States Patent Office 3,809,609
Patented May 7, 1974

3,809,609
TWISTED TAPE FLOW DEFLECTOR IN A NUCLEAR REACTOR FUEL ASSEMBLY
Donald Michael Krawiec, Enfield, and Frank Bevilacqua, Windsor, Conn., assignors to Combustion Engineering, Inc., Windsor, Conn.
Filed June 27, 1972, Ser. No. 266,756
Int. Cl. G21c 3/32, 15/24
U.S. Cl. 176—78                              15 Claims

ABSTRACT OF THE DISCLOSURE

A nuclear reactor fuel assembly containing a plurality of spaced, parallel fuel rods is provided with flow deflector vanes that operate on the liquid coolant flowing along channels between adjacent fuel elements to promote mixing of the coolant and also to produce more effective contact of the fuel rod surfaces with the liquid. The vanes are of particular configuration and are integrally formed on twisted, thin metal ribbon strips. The ribbon strips can be individually disposed between adjacent rows of fuel elements or interconnected to form a grid-like structure through which the fuel elements extend.

BACKGROUND OF THE DISCLOSURE

The fuel or fissionable material for nuclear reactors is conventionally in the form of fuel elements or rods which are, in turn, grouped together in reactors in bundles comprising fuel element assemblies. An elongated support means in the fuel assembly is provided to vertically support the fuel elements or rods. A plurality of longitudinally spaced grids extend across, and are secured to, this elongated support means. The fuel rods, in turn, extend in a parallel array through openings in the grids and vertically supported by the bottom end portion of the support means. Each grid has means for laterally positioning the fuel rods. Nuclear reactors have a number of such fuel element assemblies therein comprising the reactor core. The liquid moderator-coolant, normally water, flows upwardly through the reactor core in the channels between the fuel elements to remove heat. Reference may be made to U.S. Pat. No. 3,379,619 for a more detailed description of a typical assembly.

One of the operating limitations on current reactors is established by the onset of film boiling on the surfaces of the fuel elements. This phenomenon is commonly described qualitatively as departure from nucleate boiling (DNB) and quantitatively in terms of the critical heat flux (CHF) or the amount of heat flux existing when the DNB occurs. This condition is effected by the fuel element spacing, the system pressure, the heat flux, the coolant enthalpy and the coolant velocity. When DNB occurs, there is a rapid rise in the temperature of the fuel element cladding due to the reduced heat transfer and failure of the cladding generally results. Therefore, in order to maintain a factor of safety, the reactor must be operated a certain margin below the CHF and the point at which DNB occurs. This margin is referred to as the "thermal margin."

Nuclear reactors normally have regions in the core which have a higher neutron flux and power density than other regions. This may be caused by a number of factors, one of which is the presence of control rod channels in the core. When the control rods are withdrawn, the control rod channels are filled with moderator which increases the local moderating capacity and thereby increases the power generated in the adjacent fuel. In these regions of high power density, known as "hot channels," there is a higher rate of coolant enthalpy rise than in other channels. It is such hot channels that set the maximum operating condition for the reactor and limit the amount of power that can be generated since it is in these channels that the critical thermal margin would be reached first.

SUMMARY OF THE INVENTION

It has been found that coolant flow inclined to the fuel elements will result in a higher value for the critical heat flux probably because such flow inhibits the formation of steam bubbles and superheated water layers or voids which are found to exist over the fuel element surface just prior to DNB in the presence of parallel flow. It has also been found that mixing vanes or flow deflectors placed in the coolant flow channels of a reactor core will mix coolant from various channels and thus tend to reduce the effect of hot channels. The mixing lowers the high coolant enthalpy rise in the hot channels and tends to average out the enthalpy rise of the coolant over the entire core cross section. Both effects mean that the reactor can be operated at a higher power level and still maintain a safe thermal margin.

It is therefore an object of the present invention to provide a novel arrangement of coolant flow deflectors in the reactor core.

Another object of the invention is to provide flow deflectors which will effectively cause disturbance of the coolant flow adjacent the surface of the fuel elements as well as cause mixing of the coolant from various channels.

Yet another object of the invention is to provide flow deflectors that are operative to effect a more uniform dispersal of coolant liquid about the peripheral surface of each fuel rod.

Still another object of the invention is to provide flow deflector apparatus that is characterized by ease of manufacture and installation.

Briefly, the objects of the invention are accomplished by providing coolant flow deflecting apparatus in the spaces between adjacent rows of fuel elements. The apparatus is in the form of elongated metal ribbon strips that each contain longitudinally spaced deflector vanes integrally formed thereon. The vanes each include a pair of angularly offset arms that are configured and disposed in such a manner as will produce a more effective deflection of liquid coolant with respect to the fuel elements and the channels formed therebetween. The ribbons can be disposed as individual parallel strips or can be interconnected in grid-like fashion. Additionally, they can be independently supported in the fuel assembly or attached to the fuel element spacer grid structure.

For a better understanding of the invention, its operating advantages and the specific objects obtained by its use, reference should be made to the accompanying drawings and description which relate to various embodiments of the invention.

DESCRIPTION OF THE PREFERRED EMBODIMENT

Figure 1:
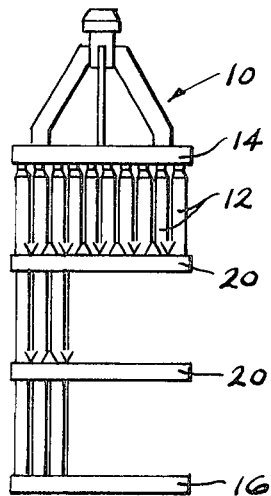
FIG. 1 is an elevational view of a fuel assembly incorporating flow deflector apparatus according to the present invention.
Figure 2:
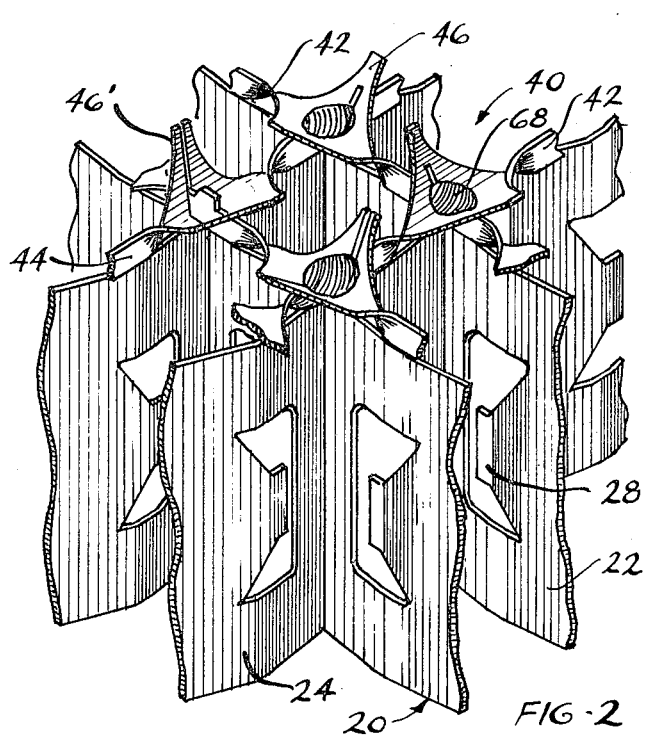
FIG. 2 is a perspective view of a preferred form of flow deflector apparatus according to the invention.

Referring now to the drawings, FIG. 1 illustrates a typical heterogeneous nuclear reactor fuel assembly 10 containing a plurality of upstanding, parallel fuel elements 12 that are held in place by upper and lower end fittings 14 and 16 respectively. Control rods (not shown) are operable within the fuel assembly to regulate the operation of the reactor core in a manner that is well known in the art. The core of a nuclear reactor is formed of a plurality of such fuel assemblies 10 and it is in such assemblies that the coolant flow deflectors of the present invention are incorporated.

At longitudinal spaced points throughout the length of the fuel assembly 10 are disposed fuel element support structures 20 which operate to provide lateral spacing and support for the elements that comprise the fuel assembly. The support structure 20 each comprise a plurality of intersecting thin plate members, referred to as grid strips 22 and 24. They are provided with a somewhat serpentine configuration resulting in the formation of hard stops 26 against which the support members of the fuel assembly are pressed by stamped resilient spring fingers 28 that engage the surface of the members at positions removed from the hard stops.

Figure 3:
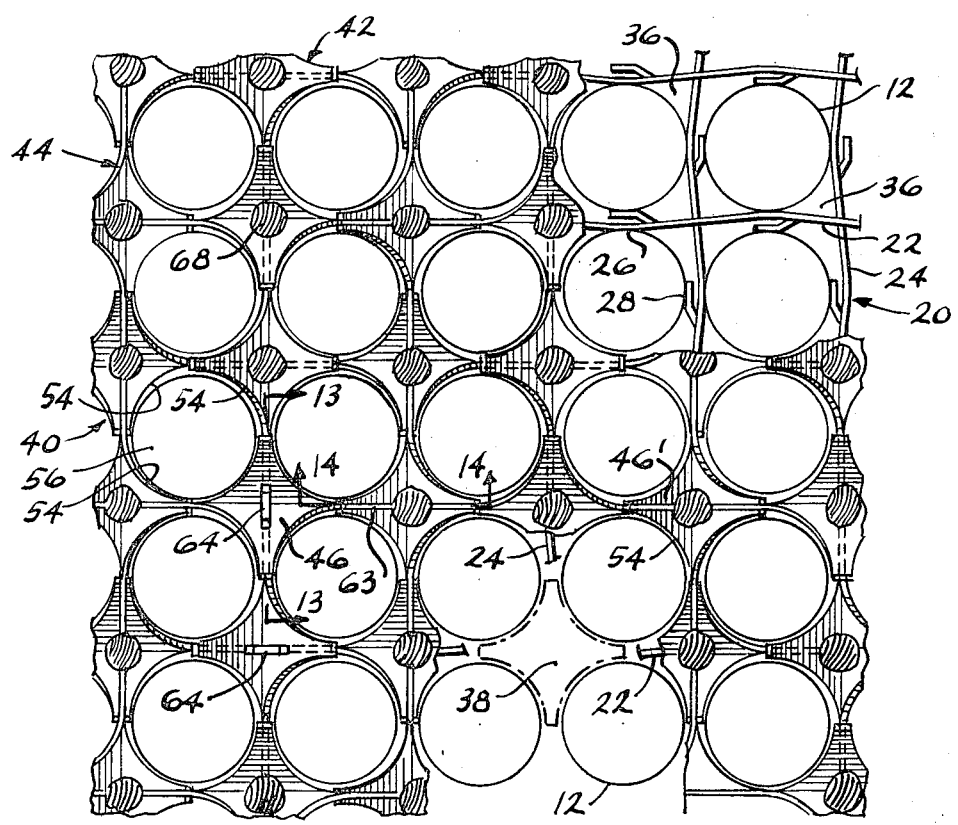
FIG. 3 is a plan view, partly broken away, of the flow deflector apparatus of FIG. 2.
Figure 16:
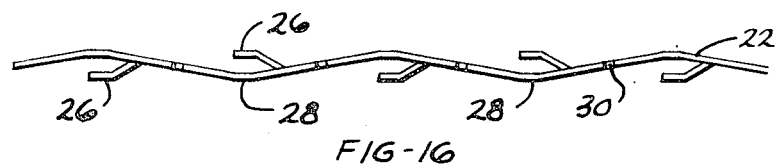
FIG. 16 is a view taken along line 16—16 of FIG. 15.
Figure 15:
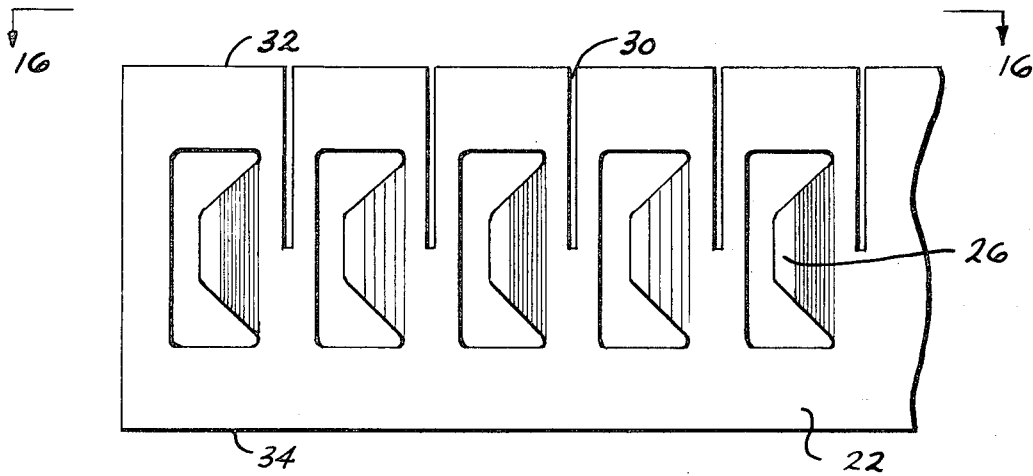
FIG. 15 is an elevation view of one spacer grid strip prior to assembly.
Figure 18:
FIG. 18 is a view taken along line 18—18 of FIG. 17.
Figure 17:
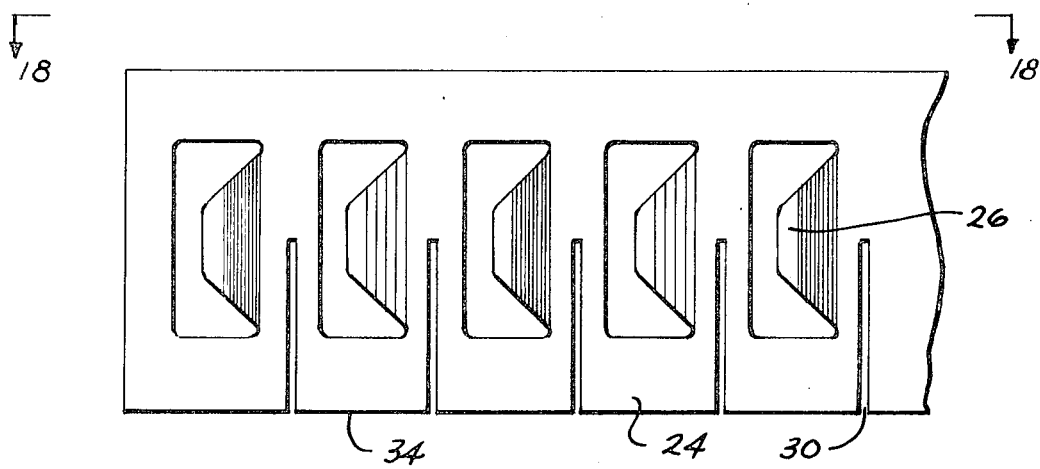
FIG. 17 is an elevation view of another spacer grid strip prior to assembly.

In forming the support structures 20, the grid strips 22 (FIGS. 15 and 16) are assembled in mutually parallel relation but in intersecting relation with respect to the strips 24 (FIGS. 15 and 17) which are, themselves, mutually parallel. Interlocking slots 30 are provided at longitudinally spaced locations along each of the strips and are operative to retain the strips in lattice array as best shown in FIG. 3. The interlocking slots 30 are disposed along the upper edge 32 of the strips 22 and along the lower edge 34 of strips 24 whereby the strips, when assembled, define a so-called "egg crate" structure containing a plurality of spaced compartments 36 disposed in a square pitch array through which the supported members extend.

It will be seen from FIG. 3 that the fuel elements 12 are each disposed in one of the compartments 36 of the support structures 20 and are retained therein by the action of the spring fingers 28 that urge the elements against the hard stops 26. The resultant effect is to mount the fuel elements 12 in substantially uniformly spaced relation. The configuration of the support structures 20 is such that the fuel elements 12 are disposed on a square pitch array with the space enclosed by the facing quadrants of four adjacent fuel elements being referred to herein as "channel" 38. The periphery of such a channel is indicated by the broken lines in FIG. 3 of the drawing. The liquid coolant which extracts heat from the reactor core flows generally longitudinally through these channels 38.

According to the present invention, coolant flow deflector apparatus is provided to operate within the fuel assembly for diverting the flow of coolant liquid along the channels 38 for the purpose of promoting mixing of the coolant with that flowing along adjacent flow channels and to insure effective washing of the surface of the contained fuel elements 12 both of which effects enhance reactor operation. In general, the apparatus of the present invention comprises twisted, thin metal ribbon strips having flow deflector vanes integrally formed thereon. In its most preferred form the apparatus consists of assemblies in which the ribbon strips are disposed in a lattice array to define grid-like structures, indicated as 40 in the drawings herein.

The flow deflector apparatus of the invention can be mounted within the fuel assembly 10 in longitudinally spaced relation from the respective fuel element support structures 20 in which case the ribbon strips that comprise the apparatus are welded or otherwise attached to the fuel elements 12. Preferably however, and as described herein, the flow deflector apparatus, is arranged for contiguous mounting upon the fuel element support structures 20.

In the form of the invention illustrated in FIGS. 2 through 18, the flow deflector apparatus defined by the assemblies 40 comprises a plurality of rectangularly arranged ribbon strips 42 and 44 that are interconnected in lattice array to define grid structures which are superposed upon the support structures 20 through which the fuel elements 12 extend. Although the ribbon strips 42 and 44 differ slightly in structural detail, both forms consist essentially of thin metal stampings (FIGS. 5 through 8) having a plurality of flow deflector vanes 46 or 46' integrally formed thereon and connected by ligament segments 48. The vanes 46 or 46' have a configuration that is symmetrical about their longitudinal and lateral axes and each comprise arms 50 that extend from opposite sides of the ligament structure 48. The arms 50, as shown, are wider at their base than at their tips 52 and have converging curvilinear side edges 54 extending between the base and the tip. The curvature of the side edges 54 is such as to provide at final assembly, a curved edge that is concentrically spaced from the fuel elements 12 to provide an arcuate opening 56 (FIG. 3) through which coolant fluid is caused to pass. The arms 50 in operative position, are angularly offset upwardly from the plane of the ligament 48 in the direction of coolant flow through the fuel assembly 10, thereby presenting the underside thereof as a deflecting surface for diverting the flow of coolant laterally from one flow channel 38 to an adjacent channel.

The stampings that form the respective ribbon strips 42 and 44 are provided with other structural details that facilitate fabrication of the assemblies 40. Those stampings (FIGS. 5 and 6) from which ribbon strips 42 are formed contain, in the region of each vane 46, a narrow elongated slot 58 extending transversely of the vane. The slot 58 is operative to receive part of the ligament 48 of an intersecting ribbon strip thereby to locate the same prior to welding. The stamping from which ribbon strips 44 are formed, on the other hand, have narrow slots 60 that are substantially coextensive with the vane arms 50 opening at the tips 52 thereof and being separated at their closed ends by a connecting web 62. These slots serve to receive the ligament of an intersecting ribbon strip and to locate the same in cradle fashion prior to welding.

Both forms of stampings are provided along their upper side edges 63 with tab projections 64 located at the midpoint of each ligament segment 48 between the respective vanes 46 or 46'. These projections, at assembly, are disposed centrally of the receptacles in the vanes 46 that receive the respective ligament segments 48 and provide weld metal deposits, some of which are indicated as 68 in the drawing, for effecting the weld connection between ribbon strips. The ligament segments 48 of the ribbon strip 42 stampings are additionally provided with recesses 66, here shown as being arcuate, disposed on the lower edge 67. When assembled, these recesses 66 are caused to straddle the connecting webs 62 in the vanes 46' of ribbon strips 44 to place the lower edges of the ligaments 48 contiguous with the upper edges of the support grid strips.

Figure 13:
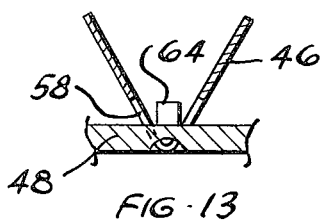
FIG. 13 is an enlarged section view taken along line 13—13 of FIG. 3.
Figure 14:
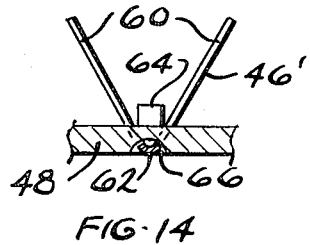
FIG. 14 is an enlarged section view taken alone line 14—14 of FIG. 3.

Referring to FIGS. 9–12 of the drawing, the stampings defining ribbon strips 42 and 44 are further formed prior to assembly to the extent of twisting the vanes 46 and 46' formed thereon to a position substantially normal to the plane of the ligament segments 48. This operation produces twists, as at 59, adjacent each end of the respective vanes. Thereafter the arms 50 of the vanes are bent upwardly with the longitudinal axes of the vanes serving as the bend lines to produce, as illustrated in FIGS. 13 and 14, members that are substantially V-shaped in section.

At final assembly, the ribbon strips 42 and 44 are assembled as illustrated in FIG. 3, by arranging them in lattice array and on alternate disposition. The ligament segments 48 on the respective strips are received in the slots 58 provided in the vanes 46 of ribbon strips 42 or are cradled in the slots 60 provided in the vane arms 50 in the ribbon strips 44. The tab projections 64 on the ligament segments 48 are centrally disposed upon the vanes that receive them and a welding operation performed to upset the tab projections thus forming weld beads 68 that interconnect the component members.

Figure 4:
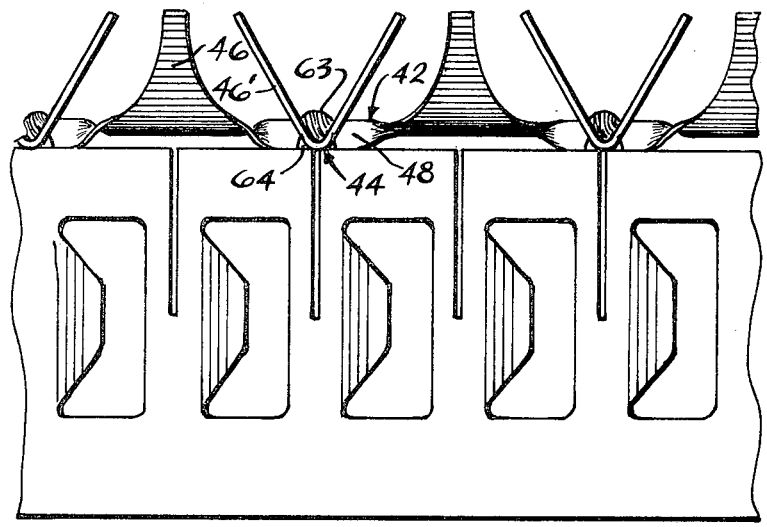
FIG. 4 is an end view of the flow deflector apparatus taken along line 4—4 of FIG. 3.
Figure 6:
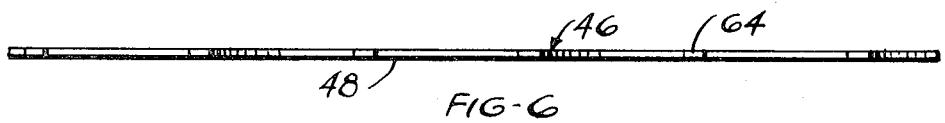
FIG. 6 is a view taken along line 6—6 of FIG. 5.
Figure 5:
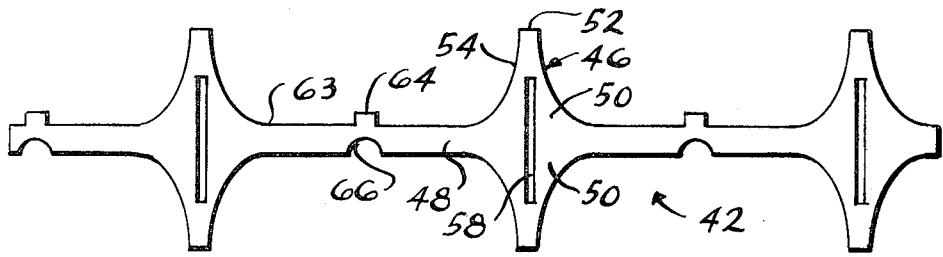
FIG. 5 is a plan view of one of the tape elements prior to forming.
Figure 8:
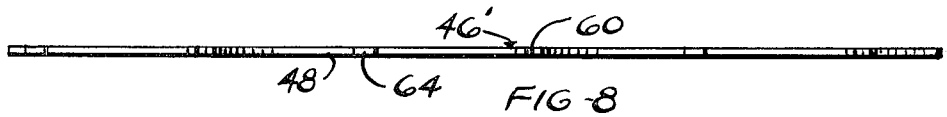
FIG. 8 is a view taken along line 8—8 of FIG. 7.
Figure 7:
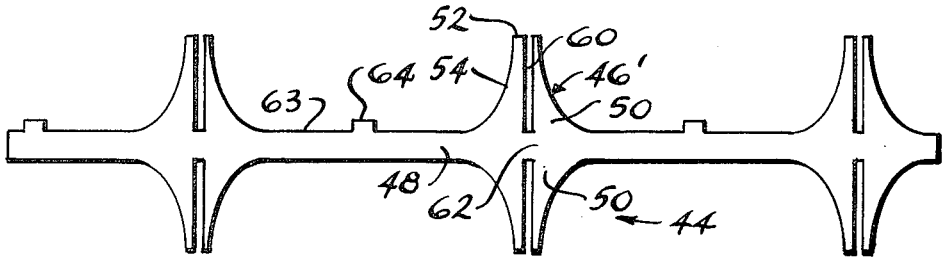
FIG. 7 is a plan view of another of the tape elements prior to forming.
Figure 9:
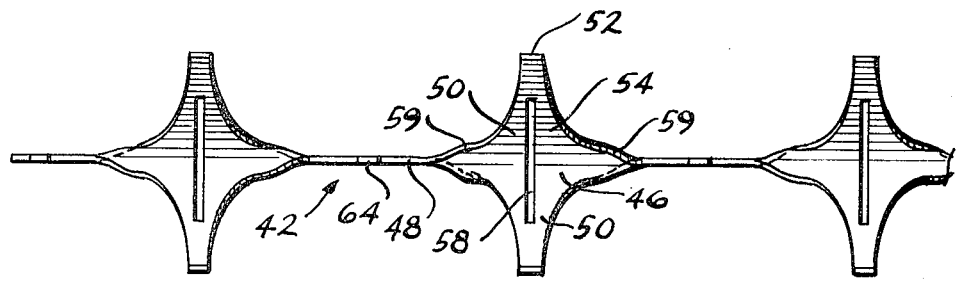
FIG. 9 is a plan view of the tape element of FIG. 5 after forming.
Figure 10:
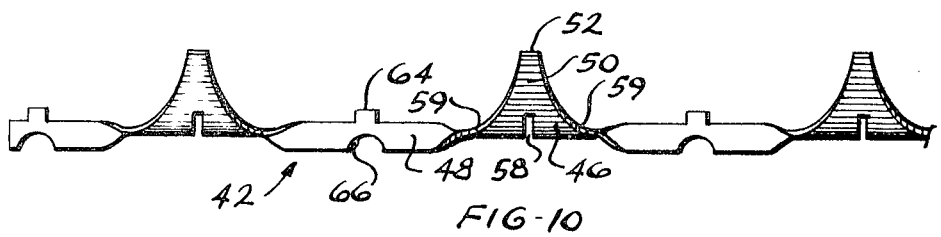
FIG. 10 is a view taken along line 10—10 of FIG. 9.
Figure 11:
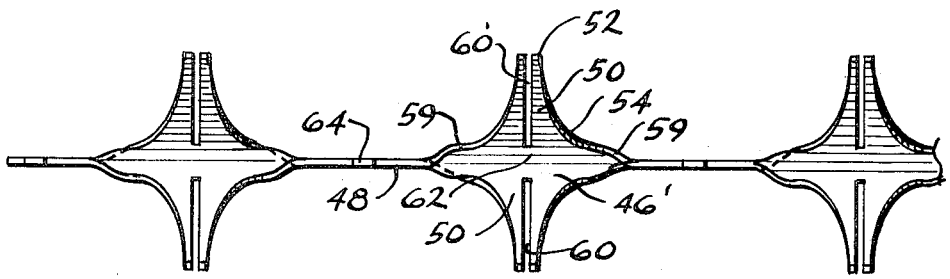
FIG. 11 is a plan view of the tape element of FIG. 7 after forming.
Figure 12:
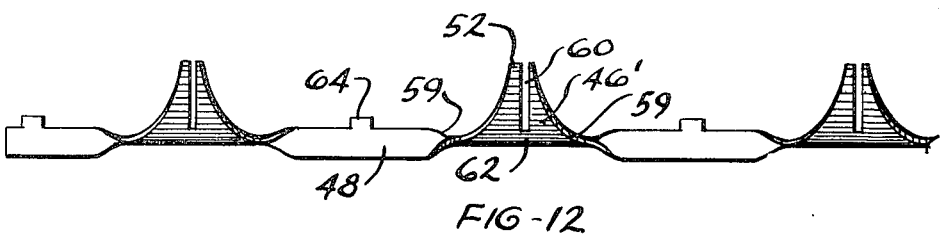
FIG. 12 is a view taken along line 12—12 of FIG. 11.

As best shown in FIGS. 3 and 4 of the drawing, the flow deflector assemblies 40 are mounted in the fuel assembly 10 with the vanes 46 and 46' thereof disposed in vertical alignment with the points of intersection of the grid strips 22 and 24 that comprise the fuel element support structures 20. The apparatus 40 can be tack welded to the grid structure at these points. Each of the vanes 46 and 46' are thus located at the midpoint of each coolant flow channel 38. Additionally, the arrangement of the respective ribbon strips 42 and 44 is such as to locate the vanes 46 and 46' on alternate disposition about each fuel element 12, with each vane being disposed at substantially right angles to the adjacent vanes. The resultant structure locates the arms 50 on the respective vanes between adjacent fuel elements 12 with the side edges 54 thereof being substantially uniformly spaced from the surface of the adjacent fuel element to form flow spaces 56. As shown, each fuel element 12 has associated with it one arm 50 from four adjacent vanes 46 and 46' such that each fuel element 12 is enclosed about its periphery by four vane arms 50 thereby defining a substantially annular flow space 56.

In operation, when reactor core cooling liquid flows upwardly through the fuel assembly 10 the flow deflector vanes 46 and 46' of the assemblies 40 are operative to divert the flowing liquid from the paths defined by the respective flow channels 38 and to direct it outwardly from its original direction of flow into contact with the surfaces of adjacent fuel elements 12 and into mixed relation with liquid flowing through adjacent flow channels. Due to the alternate disposition of the vanes 46 and 46' the circulation of flow about adjacent fuel elements 12 is in opposite directions as indicated by the arrows 57 in FIG. 3. Thus, the circulation of coolant fluid about the fuel elements will be alternately clockwise and counterclockwise. This action of the flow deflectors produces three principal effects. First, it disrupts the coolant liquid immediately adjacent the surface of the respective fuel elements 12. This tends to eliminate any DNB condition by promoting a gradual change rather than a stepped changed from nucleate boiling to stable film boiling. Second, the action promotes mixing of the coolant flowing along the respective flow channels 38. Such mixing has the effect of reducing differences in coolant temperature between the various flow channels thereby lowering high coolant enthalpy rise in the hot channels and accordingly rendering the coolant temperatures over the entire core cross-section more uniform. Third, the obstruction presented by each deflector van 40 operates to increase the velocity of the coolant liquid as it flows through the spaces 50 adjacent the fuel elements 12. This increase in flow velocity improves the film coefficient between the fuel elements 12 and the flowing coolant thereby enhancing the heat transfer therebetween.

The hereindescribed flow deflector organization exhibits still further advantages over similar apparatus of the prior art. Greater homogeneity of coolant flow characteristics results from the uniform blockage of flow presented in the respective flow channels stemming from the fact that the vanes are identically formed and each is disposed at the geometric center of each flow channel. Also, because the deflector vanes are configured to provide a wider obstruction at their base portions a greater amount of coolant liquid is positively displaced in the respective flow channels. By reducing the degree of liquid bypass in this manner more effective mixing of the coolant liquid is achieved.

Additionally, the deflector vanes in being provided with a symmetry about their longitudinal and lateral axes produce the following improved results. First, this configuration enables the vanes to be disposed in a regular pattern throughout the section of the reactor fuel assembly. Such disposition produces a substantially uniform deflection of coolant flow with respect to each fuel element. Note that, in the hereindescribed arrangement, while the direction of deflection of liquid with respect to alternate fuel elements is either in a clockwise or counterclockwise direction, the flow passages are all of substantially equal dimension such that each fuel element is washed by substantially the same amount of fluid flowing at substantially the same velocity. This feature, of course, enhances the uniformity of operation of the reactor core throughout its entire transverse section.

The symmetrical configuration of the deflector vanes coupled with their mounting at the intersection of the grid strips in the geometric centers of the channels reduces the effects of support structure vibration upon the fuel elements, and accordingly, the possibility of causing fretting of the respective members. Due to the arrangement of elements in the described apparatus the forces acting on each vane are equal and opposite thereby producing no appreciable net lateral force on the respective grid strips nor any twisting moment therebetween from which harmful vibration could result. Because the vanes are physically interconnected by twisted ligaments in the manner described, a more rigid structure results.

Figure 19:
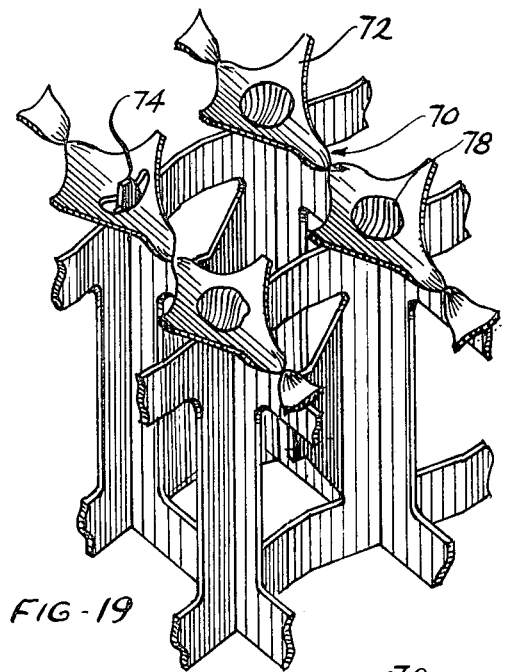
FIG. 19 is a perspective view of an alternative form of flow deflector apparatus according to the invention.
Figure 21:
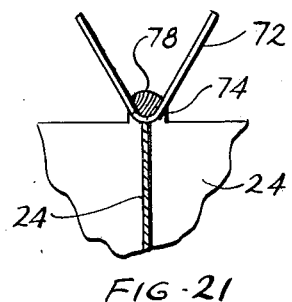
FIG. 21 is an elevational section taken along line 21—21 of FIG. 20.
Figure 20:
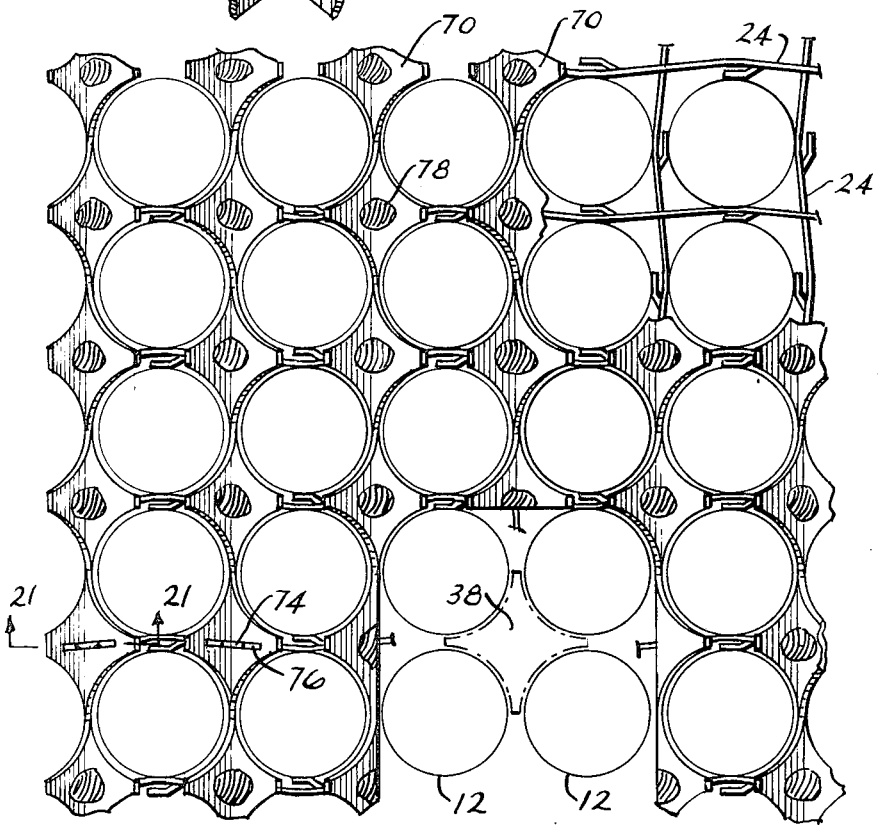
FIG. 20 is a plan view, partly broken away, of the flow deflector apparatus of FIG. 19.

In FIGS. 19 through 21 of the drawing there is illustrated an alternative, yet somewhat less desirable form of the invention. In this embodiment, the flow deflector apparatus, instead of being formed as a grid similar to the previously described arrangement, comprises individual ribbon strips 70 disposed in mutually parallel relation and extending through the fuel assembly 10 in the spaces between adjacent rows of fuel elements 12. The ribbon strips 70 are formed with longitudinally spaced vanes, indicated as 72, having substantially the same configuration as the vanes 46 and 46' employed in the prior embodiment. They are mounted on the upper edge of the fuel element support structure 20 wherein one set of grid strips, here shown as members 22, are provided with weld tab projections 74 to attach the strips. Attachment is effected by the weld tab projections 74 being inserted through elongated openings 76 provided in the ribbon strips at about the center of the vanes 72 followed by welding the same to form weld beads 78.

The operation of the alternate form of flow deflector apparatus is similar to the previously described embodiment in that coolant fluid flowing upwardly through the fuel assembly channels 38 is directed laterally of its flow path into mixing relation with fluid flowing through adjacent channels. The operation of this embodiment of the apparatus differs from the prior form, however, in that the vanes 76 in adjacent ribbon strips 70, being merely oppositely disposed from one another, effects fluid circulation in each compartment 36 as indicated by arrows 80 in which fluid in the various regions of the arcuate opening 56 is diverted in mutually opposite directions. This form of circulation is more disruptive of fluid flow and is less effective in mixing the fluid than is the previously described arrangement.

What is claimed is:

1. A nuclear reactor fuel assembly comprising:
   (a) a plurality of parallelly disposed elongated fuel elements arranged in spaced, parallel rows;
   (b) means for supporting said fuel elements in mutually spaced relation to define longitudinally extending flow channels for conducting fluid coolant therebetween; and
   (c) means for laterally deflecting coolant flow through said flow channels including:
      (i) elongated ribbon means defined by twisted strips of thin plate material disposed in the spaces between said rows of fuel elements, and longitudinally extending in a direction generally perpendicular to said flow channels,
      (ii) a plurality of deflector vanes integrally formed as a part of said twisted strips at longitudinally spaced locations therealong,
      (iii) said deflector vanes having a pair of laterally aligned arms oppositely extending from along the longitudinal axis of said strips into adjacent flow channels, said arms having a peripheral shape substantially symmetrical about the longitudinal and lateral axes thereof and being mutually divergent in the downstream direction of coolant flow through said chanels and having their peripheral edges disposed in spaced relation from the surface of the adjacent fuel elements, and
      (iv) means for fixedly mounting said ribbon means in said fuel assembly.

2. Apparatus as recited in claim 1 wherein the side edges of the arms of said deflector vanes are outwardly convergent.

3. Apparatus as recited in claim 2 wherein the side edges of the arms of said deflector vanes are arcuate in shape and substantially uniformly spaced throughout their length from the surface of the adjacent fuel elements.

4. Apparatus as recited in claim 1 wherein the arms of each of said vanes are angularly disposed with respect to the longitudinal axis of the associated flow channel.

5. Apparatus as recited in claim 4 wherein the included angle of divergence between the respective arms in each vane is about sixty degrees.

6. Apparatus as recited in claim 1 wherein said strip is twisted between adjacent deflector vanes.

7. Apparatus as recited in claim 6 wherein the extent of twist is at least ninety degrees.

8. Apparatus as recited in claim 7 wherein said degree of twist is about one hundred eighty degrees.

9. Apparatus as recited in claim 6 wherein said strip is twisted immediately adjacent the opposite ends of each of said deflector vanes.

10. Apparatus as recited in claim 9 wherein each of said twists are about ninety degrees in extent.

11. Apparatus as recited in claim 1 in which said deflector vanes each contain slot means and wherein said means for mounting the ribbon means includes a consumable weld metal tab received by said slot means.

12. Apparatus as recited in claim 11 wherein at least some of said vanes contain a central slot for reception of said consumable weld metal tab.

13. Apparatus as recited in claim 12 wherein said ribbon means comprise separate parallel strips disposed between said rows of fuel elements.

14. Apparatus as recited in claim 11 wherein said ribbon means comprises a plurality of interengaged strips arranged in a grid defining spaces through which said fuel elements extend, and means for attaching said strips in mutually fixed relation.

15. Apparatus as recited in claim 14 wherein said strips include integrally formed consumable weld metal tabs interposed between each of said vanes, the vanes on one group of strips in said grid having central slot for reception of tabs on the other group of strips, and the vanes on said other group of strips having arms bearing aligned slots for reception of tabs on said one group of strips.

References Cited

UNITED STATES PATENTS

| | | | |
|---|---|---|---|
| 3,379,619 | 4/1968 | Andrews et al. | 176—76 |
| 3,589,438 | 6/1971 | Boorman | 176—78 |
| 3,395,077 | 7/1968 | Tong et al. | 176—61 |
| 3,663,367 | 5/1972 | Calvin | 176—78 |

FOREIGN PATENTS

| | | | |
|---|---|---|---|
| 1,439,362 | 4/1969 | Germany | 176—78 |
| 1,514,558 | 6/1969 | Germany | 176—78 |
| 1,244,981 | 7/1967 | Germany | 176—78 |

CARL D. QUARFORTH, Primary Examiner

R. S. GAITHER, Assistant Examiner

U.S. Cl. X.R.

176—76